US008044944B2

(12) United States Patent
Liu

(10) Patent No.: US 8,044,944 B2
(45) Date of Patent: Oct. 25, 2011

(54) DEFECTIVE PIXEL MANAGEMENT FOR FLAT PANEL DISPLAYS

(75) Inventor: Li Liu, Woodbridge (CA)

(73) Assignee: NVIDIA Corporation, Santa Clara, CA (US)

( * ) Notice: Subject to any disclaimer, the term of this patent is extended or adjusted under 35 U.S.C. 154(b) by 953 days.

(21) Appl. No.: 11/187,774

(22) Filed: Jul. 22, 2005

(65) Prior Publication Data

US 2007/0030229 A1 Feb. 8, 2007

(51) Int. Cl.
*G06F 3/038* (2006.01)

(52) U.S. Cl. ........................................................ 345/204

(58) Field of Classification Search .................... 345/90, 345/204, 89, 92; 349/192; 382/141, 149
See application file for complete search history.

(56) References Cited

U.S. PATENT DOCUMENTS 5,303,072 A * 4/1994 Takeda et al. ................... 349/48
5,504,504 A * 4/1996 Markandey et al. .......... 345/214
2002/0101558 A1* 8/2002 Nemeth ........................ 349/192
2002/0122123 A1* 9/2002 Kimura ......................... 348/246
2004/0174320 A1* 9/2004 Matthijs et al. ................. 345/30
2005/0179675 A1* 8/2005 Hekstra et al. ................ 345/204
2007/0126657 A1* 6/2007 Kimpe ............................ 345/55

FOREIGN PATENT DOCUMENTS

| | | |
|---|---|---|
| EP | 1 536 399 | 6/2005 |
| KR | 2005007560 | 1/2005 |
| WO | WO 03/100756 | 12/2003 |

OTHER PUBLICATIONS

International Search Report. Aug. 19, 2008.
KIPO Notice of Preliminary Rejection, KR Appl. No. 10-2006-68635, mailed Sep. 24, 2010.

* cited by examiner

*Primary Examiner* — Richard Hjerpe
*Assistant Examiner* — Carolyn R Edwards
(74) *Attorney, Agent, or Firm* — Patterson & Sheridan, LLP

(57) ABSTRACT

Systems and methods for identifying defective pixels and adjusting an input to control display of the defective pixels may improve the quality of the image viewed on a flat panel display including one or more defective pixels. The screen position of each defective pixel is identified and stored. Adjustment information is also stored for each defective pixel. The adjustment information is used to modify a stored color value for each defective pixel or to disable one or more color components of each defective pixel prior to displaying an image on a flat panel display device including the defective pixels.

18 Claims, 7 Drawing Sheets

DEFECTIVE PIXEL MANAGEMENT FOR FLAT PANEL DISPLAYS

BACKGROUND OF THE INVENTION

1. Field of the Invention

Embodiments of the present invention generally relate to identifying defective pixels in a flat panel display and adjusting the inputs for those pixels.

2. Description of the Related Art

Conventional flat panel displays typically suffer from pixels that are defective, either failing completely, e.g., displaying black or white, or having one or more color components (red, green, or blue) that fail. Because the failures are typically the result of manufacturing defects, they are permanent and cause visual artifacts in any image displayed on the defective flat panel display.

Accordingly, there is a desire to control the display of defective pixels for flat panel displays to improve the quality an image displayed on each defective flat panel display.

SUMMARY OF THE INVENTION

The current invention involves new systems and methods for identifying defective pixels and adjusting an input to control display of the defective pixels. Adjusting the input for a defective pixel may improve the quality of the image viewed on a flat panel display including the defective pixel. For example, when transistors controlling each color component of a defective pixel are stuck in an on state, so that the defective pixel appears white on the flat panel display, the quality of an image may be improved if the defective pixel is not lit, i.e., is set to black.

The screen position of each defective pixel is identified and stored. Adjustment information is also stored for each defective pixel. The adjustment information may be used to modify a stored color value for each defective pixel prior to displaying an image. The defective pixel may be disabled or one or more of the color components may be stored modified or disabled.

Various embodiments of a method of the invention for characterizing defective pixels for a flat panel display device include obtaining a screen position of the flat panel display device corresponding to a defective pixel, determining adjustment information for use in controlling display of the defective pixel, and storing the screen position and the adjustment information for the defective pixel.

Various embodiments of a method of the invention for adjusting an input to control display of defective pixels for a flat panel display device include receiving a screen position of the flat panel display device corresponding to a defective pixel, receiving adjustment information for the defective pixel, adjusting the input to control display of the defective pixel based on the adjustment information, and outputting the defective pixel for display at the screen position on the flat panel display device.

Various embodiments of a computer-readable medium comprise a program which, when executed by a programmable graphics processor, performs a process for adjusting an input to control display of defective pixels for a flat panel display device. The process includes receiving a screen position of the flat panel display device corresponding to a defective pixel, receiving adjustment information for the defective pixel, adjusting the input to control display of the defective pixel based on the adjustment information, and outputting the defective pixel for display at the screen position on the flat panel display device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves new methods for identifying defective pixels and disabling defective pixels or adjusting stored color components for each defective pixel to control display of the defective pixels. The stored color components may be adjusted based on a static operating mode. For example, each color component of a defective pixel may be disabled to display black or may be scaled to reduce the saturation level of the stored color components. The stored color components may also be adjusted based on an adaptive operating mode. For example, the stored color components may be modified based on the stored color components and the specific color components that may be properly displayed by the defective pixel. Adjusting the stored color components for defective pixels or disabling defective pixels may improve the quality of an image viewed on a flat panel display that includes one or more defective pixels.

Figure 1A:
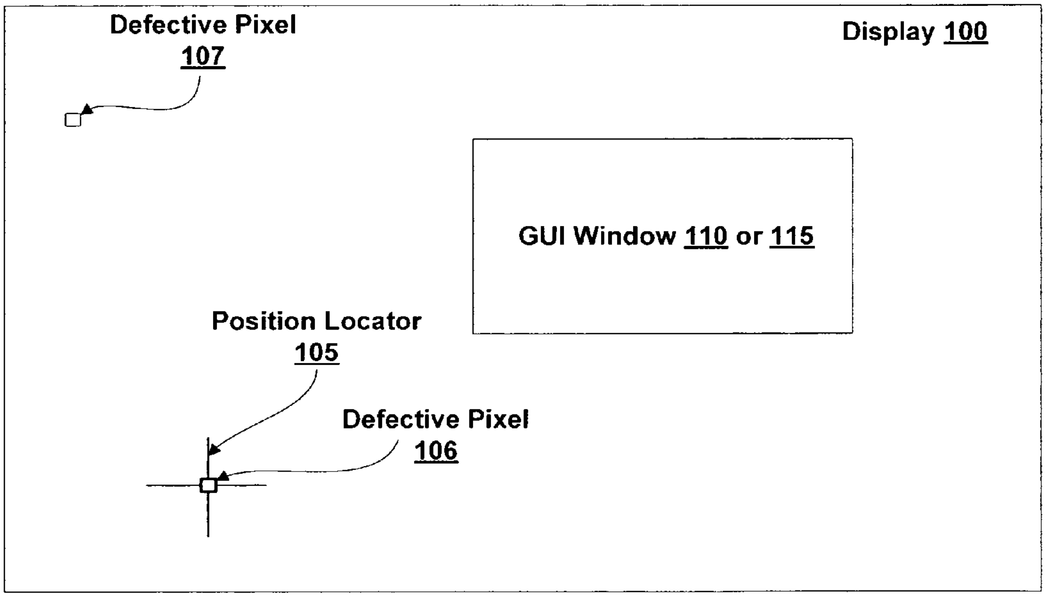
FIG. 1A illustrates a display including defective pixels, in accordance with one or more aspects of the present invention.

FIG. 1A illustrates a flat panel display, display 100, including defective pixels 106 and 107, in accordance with one or more aspects of the present invention. A position locator 105 is controlled by a user to identify the coordinates of a defective pixel, such as defective pixel 106. In some embodiments of the present invention, the user places position locator 105 over a defective pixel and activates a mouse button to store the position for that particular defective pixel. A GUI (graphics user interface) window 110 includes selectable buttons to assist in capture of the defective pixel position and other characteristics, as described in conjunction with FIGS. 1B and 1D. GUI window 110 may be positioned by the user or by a defective pixel manager application that controls display of GUI window 110 or 115 so that it does not obstruct a defective pixel. When the defective pixel manager application is invoked by a user, GUI window 110 is displayed on display 100.

Figure 1B:
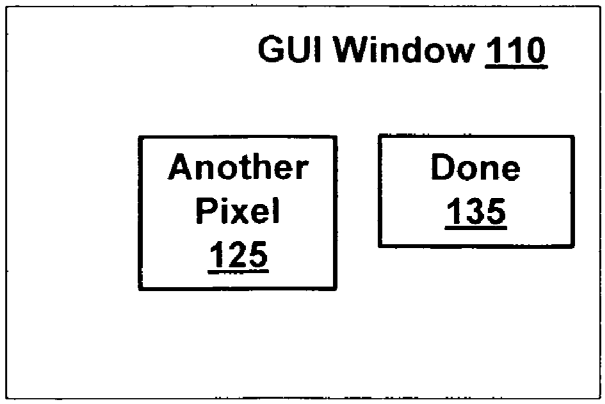
FIG. 1B illustrates an exemplary embodiment of a GUI window, in accordance with one or more aspects of the present invention.

FIG. 1B illustrates an exemplary embodiment of GUI window 110, in accordance with one or more aspects of the present invention. GUI window 110 includes two selectable buttons, another pixel 125 and done 135. Each time another pixel 125 is selected a user may identify the screen coordinates of a defective pixel in display 100. When a user has completed identification of the defective pixels, the user may select done 135 and GUI window 110 will close.

In order to facilitate identification of the defective pixels, the defective pixel manager application will typically set the display to a completely white image and then to a completely black image for each selection of another pixel 125. This permits the user to see defective pixels that have one or more color components (red, green, blue) stuck on or stuck off. In a conventional flat panel display a separate transistor controls each color component and each transistor may fail and be stuck on or off due to a fabrication defect in the flat panel display.

Figure 1C:
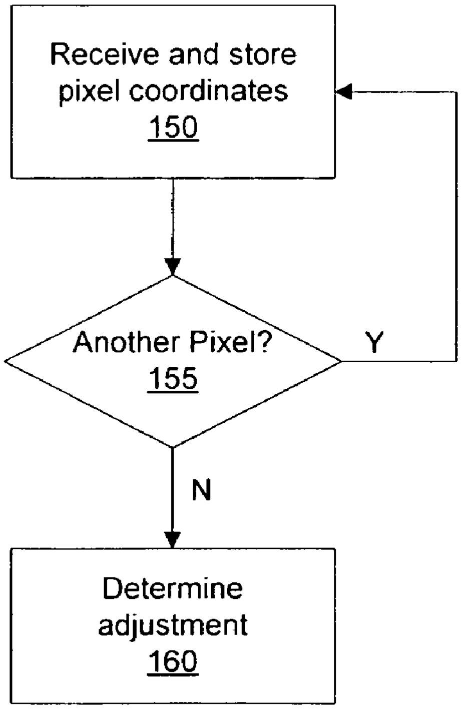
FIG. 1C illustrates an exemplary embodiment of a method for characterizing defective pixels, in accordance with one or more aspects of the present invention.

FIG. 1C illustrates an exemplary embodiment of a method for characterizing defective pixels to produce adjustment information, in accordance with one or more aspects of the present invention. In step 150 the defective pixel manager application receives screen coordinates corresponding to a defective pixel and stores the position. In step 155 the defective pixel manager application determines if another defective pixel is identified, i.e., if another pixel 125 is selected, and, if so, returns to step 150. Otherwise, in step 160 the defective pixel manager application determines adjustments for the identified defective pixel(s) and stores adjustment information for each defective pixel. For example, the adjustment information may indicate that a defective pixel should be disabled so that it will be displayed as black (stuck off) rather than white (stuck on). Specifically, the transistors controlling the particular defective pixel would be disabled to force stuck on transistors to become effectively stuck off. An additional benefit of disabling defective pixels is that current does not flow through the disabled transistors, and therefore power consumption is reduced for those disabled transistors.

Figure 1D:
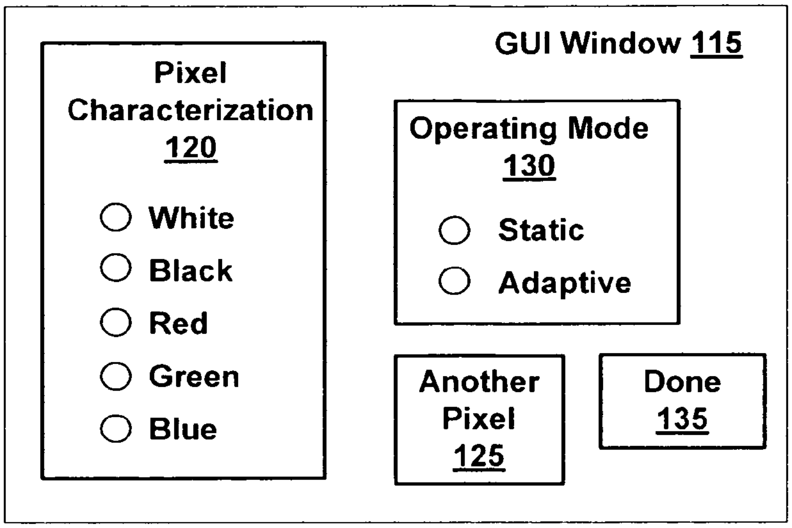
FIG. 1D illustrates another exemplary embodiment of a GUI window, in accordance with one or more aspects of the present invention.

FIG. 1D illustrates another exemplary embodiment of a GUI window, GUI window 115, in accordance with one or more aspects of the present invention. In this exemplary embodiment, GUI window 115 includes the two selectable buttons, another pixel 125 and done 135 and also includes a pixel characterization 120 selection menu and an operating mode 130 selection menu. Another pixel 125 and done 135 function as previously described in conjunction with FIG. 1B. Pixel characterization 120 enables a user to identify which color components can be displayed by a particular defective pixel.

In order to facilitate characterization of the defective pixels, the defective pixel manager application will set the display to a sequence of images, including a completely white image, a completely black image, a completely red image, a completely green image, and a completely blue image. This permits the user to see which color component(s), if any, a defective pixel can display. The user can then identify which color components(s) can be displayed by selecting one or more buttons in pixel characterization 120. This pixel characterization information entered via pixel characterization 120 is stored by the defective pixel manager application as part of the adjustment information for each defective pixel. In some embodiments of the present invention, the white and black buttons in pixel characterization 120 may be omitted. In other embodiments of the present invention, the red, green, and blue buttons in pixel characterization 120 may be omitted.

A user may select a specific operating mode in order to adjust inputs to control the display of defective pixels using operating mode 130. A static operating mode may be selected to indicate that a predetermined adjustment should be applied to each defective pixel. For example, the static operating mode may be used to disable all defective pixels. In another embodiment of the present invention, the static operating mode may be used to scale each color component that is stored for each of the defective pixels. In an alternative embodiment of the present invention, the operating mode, pixel characterization information, and adjustment information for the defective pixels for a particular display device is provided by a source other than a user of the display device. For example, a display configuration file may be provided by the manufacturer of the particular display device.

A frame buffer stores the color components for each pixel of an image for display on a display device. The static operating mode may be used to modify each color component corresponding to a defective pixel that is stored in the frame buffer, in order to reduce the saturation of color components that are not stuck on or off. Rather than displaying a black pixel, as is the result when a defective pixel is disabled, scaling the functional color components reduces the intensity of the defective pixel. For example, if the blue and green color components for a defective pixel are stuck on, the red component may be scaled to reduce the intensity of the defective pixel. The static operating mode is used to determine an adjustment that is applied independent of the color stored in a frame buffer corresponding to the defective pixel. In other embodiments of the present invention, the color components for defective pixels may be scaled to increase the intensity of the defective pixels.

The adaptive operating mode may be selected to specify that the stored color components for each defective pixel should be modified or disabled based on the pixel characterization information provided via pixel characterization 120. For example, when a stored color for a defective pixel is blue (red and green have values of zero) and the blue component functions properly, but the red component is stuck on, the red component may be disabled, permitting the pixel to be displayed properly as blue. Adaptively disabling a color component that does not properly function for a defective pixel on a flat panel display may permit an image to be displayed without a visual artifact caused by the defective pixel.

Figure 1E:
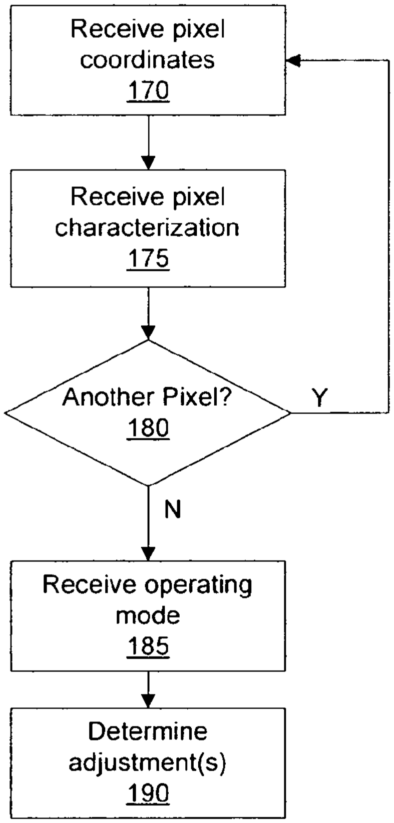
FIG. 1E illustrates another exemplary embodiment of a method for characterizing defective pixels, in accordance with one or more aspects of the present invention.

FIG. 1E illustrates another exemplary embodiment of a method for characterizing defective pixels to produce pixel characterization information for each defective pixel, in accordance with one or more aspects of the present invention. In step 170 the defective pixel manager application receives screen coordinates corresponding to a defective pixel and stores the position. In step 175 the defective pixel manager application receives pixel characterization information for the defective pixel and stores the pixel characterization information. In step 180 the defective pixel manager application determines if another defective pixel is identified, i.e., if another pixel 125 in GUI window 115 is selected, and, if so, returns to step 170. Otherwise, in step 185, the defective pixel manager application the defective pixel manager application receives an operating mode selection for the defective pixel and stores the operating mode.

In step 190 the defective pixel manager application determines adjustments for the identified defective pixel(s) and stores adjustment information for each defective pixel. When the operating mode is static the defective pixel manager application may simply disable the defective pixel(s). Alternatively, the defective pixel manager application may also determine a scaling factor that is used to scale each properly functioning color component of a defective pixel and disable nonfunctioning color components of the defective pixel(s). When the operating mode is adaptive the defective pixel manager application may simply store the operating mode and determine specific adjustments for each component of the defective pixel(s) based on the colors stored in the frame buffer corresponding to each of the defective pixel(s), as described in conjunction with FIG. 4.

Figure 2A:
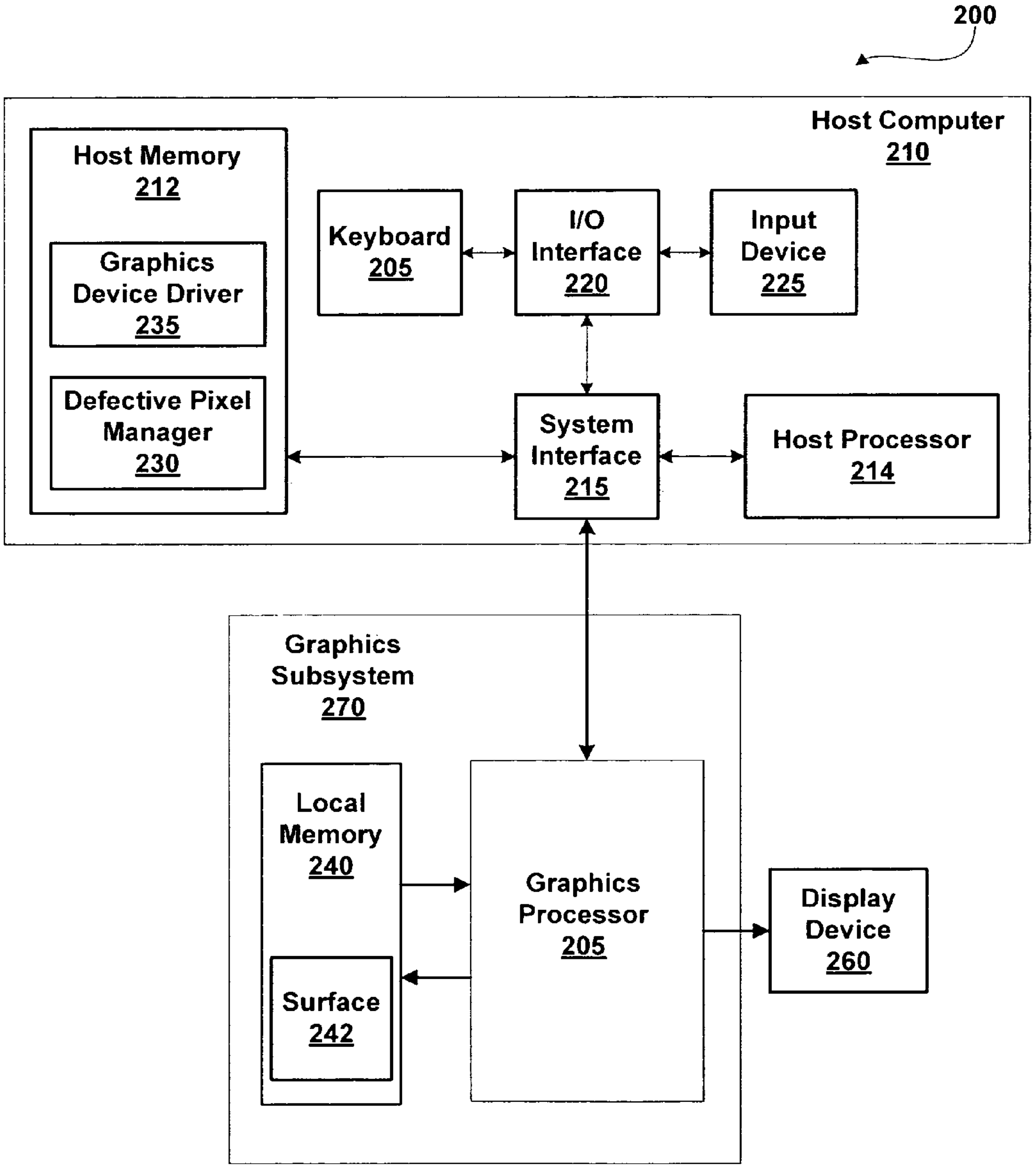
FIGS. 2A and 2B are block diagrams of exemplary embodiments of respective computing systems, including a host computer and a display device, in accordance with one or more aspects of the present invention.

FIG. 2A is a block diagram of an exemplary embodiment of a respective computing system 200, including a host computer 210, a graphics subsystem 270, and a display device 260, in accordance with one or more aspects of the present invention. Computing system 200 may be a desktop computer, server, laptop computer, palm-sized computer, tablet computer, game console, portable wireless terminal such as a PDA (personal digital assistant) or cellular telephone, computer based simulator, or the like. Host computer 210 includes host processor 214 that may include a system memory controller to interface directly to host memory 212 or may communicate with host memory 212 through a system interface 215 (as shown). System interface 215 may be an I/O (input/output) interface or a bridge device including the system memory controller to interface directly to host memory 212. An example of system interface 215 known in the art includes Intel® Northbridge.

System interface 215 is coupled to an I/O (input/output) interface 220 to receive input signals from a keyboard 205 and an input device 225, where input device 225 may be a mouse or the like. Keyboard 205 and input device 225 are used to provide adjustment information, operating mode, and pixel characterization information to a defective pixel manager (application) 230 when GUI window 115 is displayed on display device 260.

Graphics subsystem 270 includes a local memory 240 and programmable graphics processor 205. Host computer 210 communicates with graphics subsystem 270 via system interface 215. Data, program instructions, and commands received at graphics interface 217 can be processed directly by graphics processor 205 or written to a local memory 240. Programmable graphics processor 205 uses memory to store graphics surface data, including texture maps, and program instructions, where graphics surface data is any data that is input to or output from computation units within programmable graphics processor 205. The graphics surface data is stored in a surface 242 and surface 242 may be a frame buffer. Additional surfaces may be stored in local memory 240 or host memory 212.

Programmable graphics processor 205 performs a variety of computational functions including table lookup, scalar and vector addition, multiplication, division, coordinate-system mapping, calculation of vector normals, tessellation, calculation of derivatives, rasterization, interpolation, texture mapping, shading, lighting, filtering, and the like. Programmable graphics processor 205 executes vertex programs and shader programs to process graphics primitives and produce image data for display on device 260. The (vertex or shader) program instructions and data are stored in graphics memory, e.g., portions of host memory 212, local memory 240, or storage resources within programmable graphics processor 205.

Image data stored in local memory 240 or host memory 212 in a frame buffer, such as surface 242 includes a color for each pixel represented by the frame buffer. Programmable graphics processor 205 writes the image data to surface 242 and may read the image data to modify the image data prior to display. Programmable graphics processor 205 reads surface 242 and outputs the image data to display device 260 for display. In some embodiments of the present invention, surface 242 is stored in host memory 212. Programmable graphics processor 205 may also be configured to deliver data to a display device, network, electronic control system, other computing system 200, other graphics subsystem 270, or the like.

A graphics device driver 235 interfaces between processes executed by host processor 214, such as defective pixel manager 230, and a programmable graphics processor 205, translating program instructions as needed for execution by programmable graphics processor 205. Programmable graphics processor 205 may also be programmed by defective pixel manager 230 to control the display of specific pixels within surface 242. Specifically, programmable graphics processor 205 may be configured to disable defective pixels or to modify one or more color components of defective pixels. When an adaptive operating mode is specified, programmable graphics processor 205 may read a stored color for a defective pixel and modify the color or disable one or more color components under control of defective pixel manager 230.

Figure 2B:
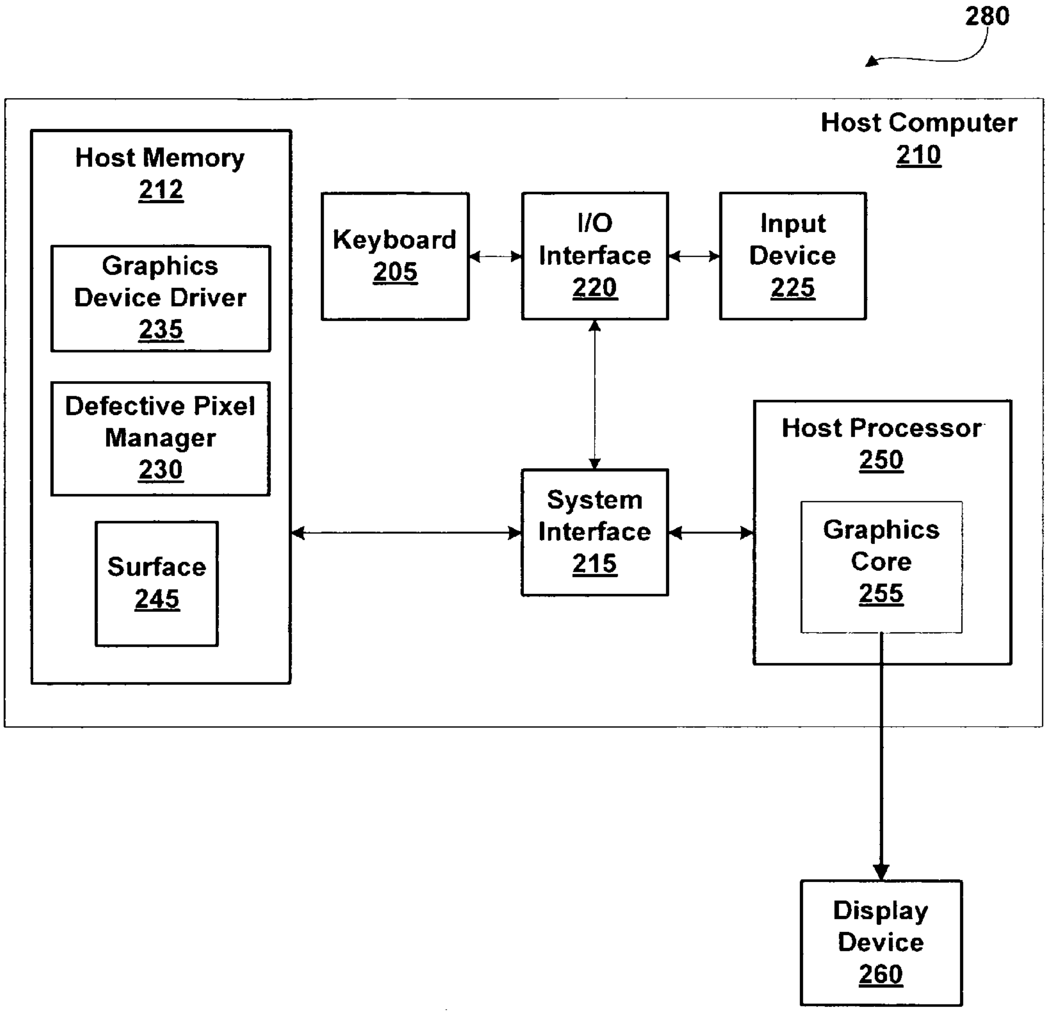

FIG. 2B is a block diagram of another exemplary embodiment of a respective computing system 280, including a host computer 210 and a display device 260, in accordance with one or more aspects of the present invention. Computing system 270 includes host memory 212, graphics device driver 235, defective pixel manager 230, keyboard 205, I/O interface 220, input device 225, system interface 215, and display device 260, described in conjunction with FIG. 2A. Rather than including a graphics subsystem 270, a graphics core 255 is integrated into host processor 250. Graphics core 255 performs at least a portion of the functions performed by programmable graphics processor 205, including processing graphics primitives to produce image data for display.

The image data may be stored in a frame buffer, such as surface 245 in host memory 212. Graphics core 255 writes the image data to surface 245 and reads the image data from surface 245 for output to display device 260. Graphics core 255 may also be programmed by defective pixel manager 230 to control the display of specific pixels within surface 245. Specifically, graphics core 255 may be configured to disable defective pixels or to modify one or more color components of defective pixels. When an adaptive operating mode is specified, graphics core 255 may read a stored color for a defective pixel and modify the color or disable one or more color components under control of defective pixel manager 230.

Figure 3:
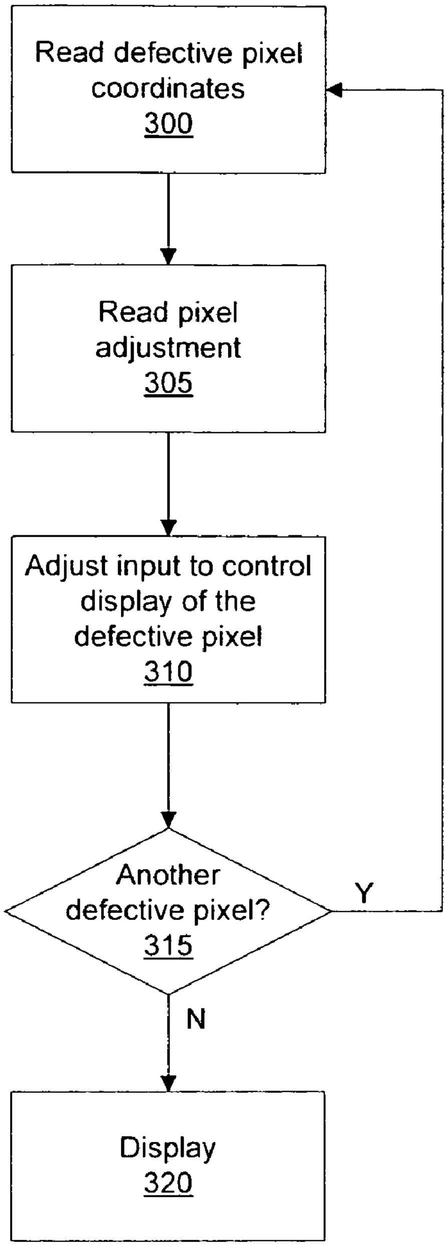
FIG. 3 illustrates an exemplary embodiment of a method for adjusting inputs to control display of defective pixels, in accordance with one or more aspects of the present invention.

FIG. 3 illustrates an exemplary embodiment of a method for adjusting inputs to control the display of defective pixels when GUI window 110 is used to capture the defective pixel position and adjustment information, in accordance with one or more aspects of the present invention. When an image buffer, such as surface 245 or surface 242 is ready for display on a display device, such as display 260, defective pixel manager 230 may adjust inputs to display device 260 to control the display of the defective pixels. In step 300 defective pixel manager 230 reads the stored pixel coordinates for a defective pixel. In step 305 defective pixel manager 230 reads the stored pixel adjustment information. The stored pixel adjustment information may indicate that defective pixels should be disabled or that the color components of defective pixels should be scaled by a predetermined value.

In step 310 defective pixel manager 230 applies the pixel adjustment information by adjusting an input to control the display of a defective pixel. When the pixel adjustment information specifies that the defective pixel should be disabled, defective pixel manager 230 adjusts an input to display device 260 via graphics subsystem 270 or graphics core 255 to disable the defective pixel corresponding to the coordinates read in step 305. When the pixel adjustment information specifies that color components of the defective pixel should be scaled, defective pixel manager 230 programs programmable graphics processor 205 or graphics core 255 to scale the color components of the defective pixel corresponding to the coordinates read in step 305.

In step 315 defective pixel manager 230 determines if another defective pixel is specified by the stored defective pixel coordinates, and, if so, steps 300, 305, and 310 are repeated. If, in step 315 defective pixel manager 230 determines that another defective pixel is not specified by the stored defective pixel coordinates, then in step 320 the frame buffer, e.g., surface 242 or 245, is output to the display device corresponding to the defective pixel coordinates, such as display device 260.

Figure 4:
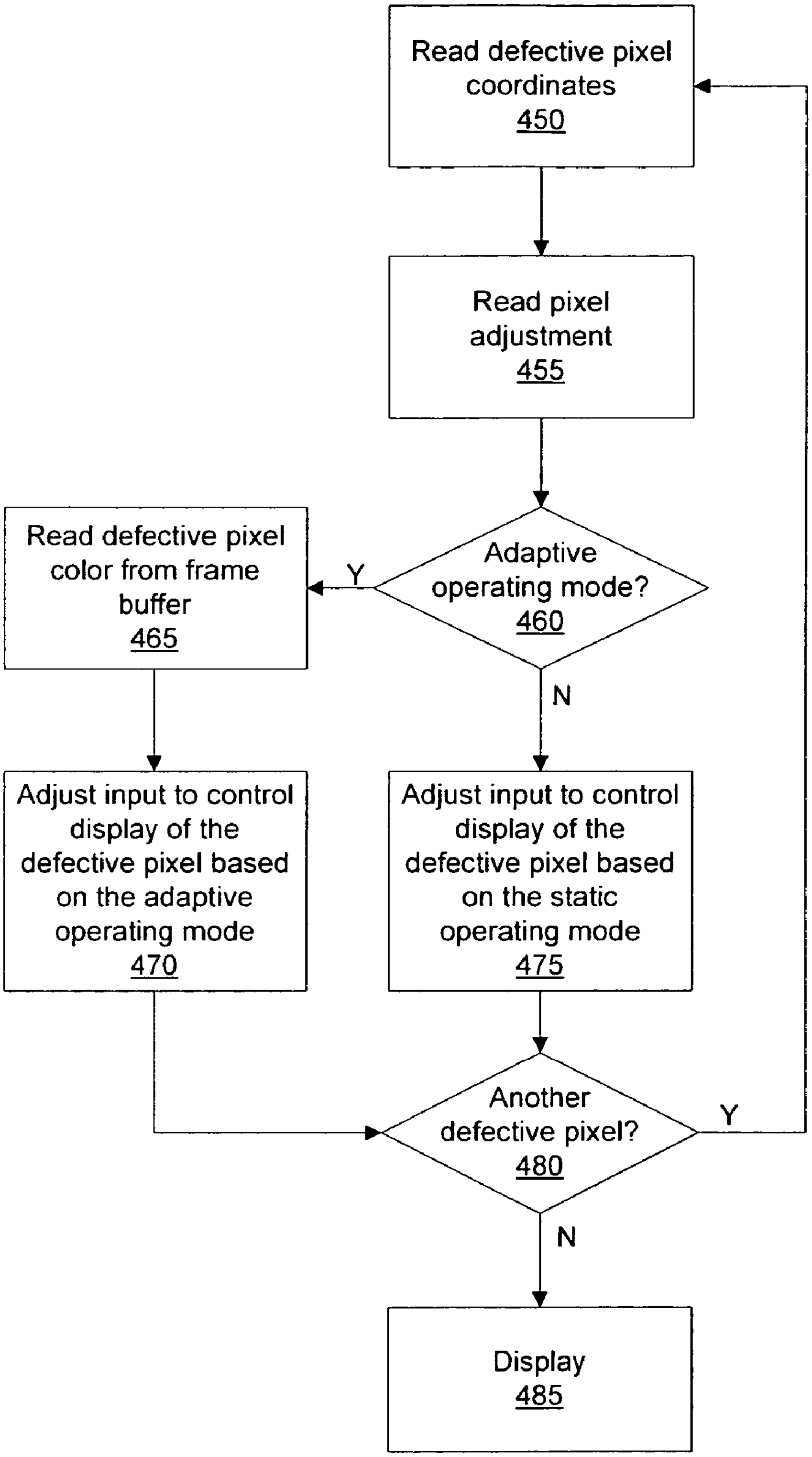
FIG. 4 illustrates another exemplary embodiment of a method for adjusting inputs to control display of defective pixels, in accordance with one or more aspects of the present invention.

FIG. 4 illustrates another exemplary embodiment of a method for adjusting inputs to control the display of defective pixels when GUI window 115 is used to capture the defective pixel position, operating mode, and adjustment information, in accordance with one or more aspects of the present invention. In step 450 defective pixel manager 230 reads the stored pixel coordinates for the defective pixels. In step 455 defective pixel manager 230 reads the stored pixel adjustment information. The stored pixel adjustment information may indicate that defective pixels should be disabled or that the color components of defective pixels should be scaled by a predetermined value. Alternatively, the stored pixel adjustment information may indicate that the defective pixels should be adjusted based on the pixel characterization information and the stored color components for each defective pixel.

In step 460 defective pixel manager 230 determines if the operating mode is adaptive, and, if so, in step 465 defective pixel manager 230 instructs programmable graphics processor 205 or graphics core 255 to read the stored color components corresponding to the defective pixel coordinates read in step 450 from surface 242 or 245, respectively. In step 470 defective pixel manager 230 applies the adaptive adjustment information to the defective pixels by adjusting inputs to control the display of each defective pixel. In some embodiments of the present invention, defective pixel manager 230 programs programmable graphics processor 205 or graphics core 255 to modify the color components for each defective pixel based on the stored pixel characterization information. In other embodiments of the present invention, defective pixel manager 230 receives the stored colors for the defective pixels, modifies the stored colors based on the stored pixel characterization information, and writes the modified colors to surface 242 or 245. In still other embodiments of the present invention, one or more color components of each defective pixel may be disabled by defective pixel manager 230 based on the stored colors and the stored pixel characterization information.

The adaptive operating mode may improve the quality of an image displayed on a flat panel display with one or more defective pixel when compared with the static mode because the color of each pixel may be adjusted based on the stored image data and the specific color components that can be properly displayed by each defective pixel. For example, when a stored color for a defective pixel is a combination of red and blue and the defective pixel is able to display green and blue, but not red (according to the pixel characterization information), the stored color may be modified to approximate the desired color (combination of red and blue). The modified color may produce a more pleasing image compared with using black or only the functioning blue component. Alternatively, one or more color components may be disabled for the defective pixel to prevent a color component that is stuck on from contributing to the displayed color for the defective pixel.

If in step 460 defective pixel manager 230 determines if the operating mode is not adaptive, then in step 475 defective pixel manager 230 applies the static adjustment information to the defective pixels. When the pixel adjustment information specifies that the defective pixels should be disabled, defective pixel manager 230 adjusts an input to display device 260 via graphics subsystem 270 or graphics core 255 to disable the defective pixels corresponding to the coordinates read in step 455. When the pixel adjustment information specifies that the defective pixels should be scaled, defective pixel manager 230 programs programmable graphics processor 205 or graphics core 255 to scale the color components of the defective pixels corresponding to the coordinates read in step 450.

In step 480 defective pixel manager 230 determines if another defective pixel is specified by the stored defective pixel coordinates, and, if so, steps 450, 455, 460, and steps 465 and 470 or steps 475 and 480 are repeated. If, in step 480 defective pixel manager 230 determines that another defective pixel is not specified by the stored defective pixel coordinates, then in step 485 the frame buffer, e.g., surface 242 or 245, is output to the display device corresponding to the defective pixel coordinates, such as display device 260.

Persons skilled in the art will appreciate that any system configured to perform the method steps of FIGS. 1C, 1E, 3, or 4 or their equivalents, is within the scope of the present invention. A user may specify the screen coordinates of defective pixels for a particular display device. The user may also provide pixel characterization information for use when an adaptive operating mode is used to adjust the color of each defective pixel input to the display device. Alternatively, the defective pixel positions and pixel characterization information may be provided by another source. Adjusting the stored color for defective pixels or disabling color components of defective pixels may improve the quality of an image viewed on a flat panel display that includes one or more defective pixels.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method of controlling display of a defective pixel of a flat panel display device, comprising:

reading pixel characterization information for the defective pixel of the flat panel display device from a memory;

determining adjustment information based on the pixel characterization information for use in controlling display of the defective pixel;

programming a graphics processor to produce image data for display on the flat panel display device, wherein the image data includes a color for the defective pixel, modify one or more color components of the defective pixel to generate modified image data based on the adjustment information, and write the modified image data to the frame buffer; and outputting the modified image data from the frame buffer to the flat panel display device;

wherein the determining of the adjustment comprises determining an operating mode that specified one of a static mode and an adaptive mode, and a defective pixel manager application programs the graphics processor to apply a predetermined adjustment to the defective pixel when the operating mode is the static mode and the defective pixel manager application programs the graphics processor to modify a color component of the defective pixel based on a color component stored in the frame buffer and the pixel characterization information when the operating mode is the adaptive mode.

2. The method of claim 1, wherein the operating mode is selected by a user.

3. The method of claim 1, wherein the operating mode is stored in the memory.

4. The method of claim 1, further comprising disabling the defective pixel when the operating mode is static.

5. The method of claim 1, further comprising determining a scaling factor that is used to scale each properly functioning color component of the defective pixel and disable each nonfunctioning color component of the defective pixel when the operating mode is static.

6. The method of claim 1, further comprising determining the adjustment for the defective pixel based on the color for the defective pixel when the operating mode is adaptive.

7. The method of claim 6, wherein the graphics processor is configured to disable a first color component for the defective pixel when the color for the defective pixel is a combination of the first color component and a second color component and the defective pixel is able to properly display the second color component and is not able to properly display the first color component.

8. The method of claim 1, wherein the pixel characterization information for the defective pixel includes coordinates of the defective pixel and per-color component stuck on and stuck off information for the defective pixel.

9. The method of claim 1, further comprising storing the adjustment information in the memory.

10. A non-transitory computer-readable medium storing instructions that, when executed by a programmable graphics processor, cause a computing system to control the display of a defective pixel of a flat panel display device, by performing the steps of:

reading pixel characterization information for a defective pixel of the flat panel display device from a memory;

determining adjustment information for use in controlling display of the defective pixel based on the pixel characterization information;

programming a graphics processor to produce image data for display on the flat panel display device, wherein the image data includes a color for the defective pixel, modify one or more color components of the defective pixel to generate modified image data based on the adjustment information, and write the modified image data to the frame buffer; and outputting the modified image data from the frame buffer to the flat panel display device;

wherein the determining of the adjustment comprises determining an operating mode that specified one of a static mode and an adaptive mode, and a defective pixel manager application programs the graphics processor to apply a predetermined adjustment to the defective pixel when the operating mode is the static mode and the defective pixel manager application programs the graphics processor to modify a color component of the defective pixel based on a color component stored in the frame buffer and the pixel characterization information when the operating mode is the adaptive mode.

11. The computer-readable medium of claim 10, further comprising disabling the defective pixel when the operating mode is static.

12. The computer-readable medium of claim 10, further comprising determining a scaling factor that is used to scale each properly functioning color component of the defective pixel and disable each nonfunctioning color component of the defective pixel when the operating mode is static.

13. The computer-readable medium of claim 10, further comprising determining the adjustment for the defective pixel based on the color for the defective pixel when the operating mode is adaptive.

14. The computer-readable medium of claim 13, wherein the graphics processor is configured to disable a first color component for the defective pixel when the color for the defective pixel is a combination of the first color component and a second color component and the defective pixel is able to properly display the second color component and is not able to properly display the first color component.

15. The computer-readable medium of claim 10, wherein the pixel characterization information for the defective pixel includes coordinates of the defective pixel and per-color component stuck on and stuck off information for the defective pixel.

16. A system configured to control the display of a defective pixel of a flat panel display device, the system comprising:

the flat panel display device;

a memory configured to store a defective pixel manager;

a processor coupled to the memory and configured to execute the defective pixel manager to perform operations of reading pixel characterization information for a defective pixel of the flat panel display device from a memory, determining adjustment information for use in controlling display of the defective pixel based on the pixel characterization information, and programming a graphics processor to modify one or more color components of the defective pixel to generate modified image data based on the adjustment information; and the graphics processor that is configured to:

produce image data for display on the flat panel display device, wherein the image data includes a color for the defective pixel and write the modified image data to the frame buffer;

wherein the determining of the adjustment comprises determining an operating mode that specified one of a static mode and an adaptive mode, and a defective pixel manager application programs the graphics processor to apply a predetermined adjustment to the defective pixel when the operating mode is the static mode and the defective pixel manager application programs the graphics processor to modify a color component of the defective pixel based on a color component stored in the frame buffer and the pixel characterization information when the operating mode is the adaptive mode.

17. The system of claim 16, wherein the defective pixel manager is configured to program the graphics processor to apply a predetermined adjustment to the defective pixel when the operating mode is the static mode and the defective pixel manager application programs the graphics processor to modify a color component of the defective pixel based on a color component stored in the frame buffer and the pixel characterization information when the operating mode is the adaptive mode.

18. The system of claim 16, wherein the defective pixel manager is configured to program the graphics processor to scale each properly functioning color component of the defective pixel and disable each nonfunctioning color component of the defective pixel.

* * * * *